(12) United States Patent
Nishida

(10) Patent No.: US 9,569,013 B2
(45) Date of Patent: Feb. 14, 2017

(54) COORDINATE DETECTION SYSTEM, INFORMATION PROCESSING APPARATUS, AND RECORDING MEDIUM

(71) Applicant: En Nishida, Tokyo (JP)

(72) Inventor: En Nishida, Tokyo (JP)

(73) Assignee: RICOH COMPANY, LTD., Tokyo (JP)

( * ) Notice: Subject to any disclaimer, the term of this patent is extended or adjusted under 35 U.S.C. 154(b) by 78 days.

(21) Appl. No.: 14/543,953

(22) Filed: Nov. 18, 2014

(65) Prior Publication Data

US 2015/0153846 A1    Jun. 4, 2015

(30) Foreign Application Priority Data

Dec. 2, 2013  (JP) ................................. 2013-249002

(51) Int. Cl.
| | |
|---|---|
| *G06F 3/0354* | (2013.01) |
| *G06F 3/03* | (2006.01) |
| *G06F 3/038* | (2013.01) |
| *G06F 3/042* | (2006.01) |
| *G01B 11/00* | (2006.01) |
| *G06F 3/041* | (2006.01) |

(52) U.S. Cl.
CPC ........ *G06F 3/03542* (2013.01); *G01B 11/005* (2013.01); *G06F 3/0308* (2013.01); *G06F 3/038* (2013.01); *G06F 3/0325* (2013.01); *G06F 3/0386* (2013.01); *G06F 3/03545* (2013.01); *G06F 3/042* (2013.01); *G06F 3/0416* (2013.01); *G06F 3/0421* (2013.01); *G06F 3/0425* (2013.01)

(58) Field of Classification Search
CPC  G06F 3/03542; G06F 3/03545; G06F 3/0354; G06F 3/038; G06F 3/0308; G06F 3/0325; G06F 3/0386; G06F 3/0317; G06F 3/0428; G06F 3/0416; G06F 3/0421
USPC ........................................................ 345/175
See application file for complete search history.

(56) References Cited

U.S. PATENT DOCUMENTS 4,568,182 A * 2/1986 Modjallal ............ G01B 11/002
                                                    178/18.09
4,688,933 A    8/1987 Lapeyre
(Continued)

FOREIGN PATENT DOCUMENTS

| JP | 2000-105671 | 4/2000 |
|---|---|---|
| JP | 2004-038528 | 2/2004 |
| WO | WO-2013128734 A1 | 9/2013 |

OTHER PUBLICATIONS

Extended European Search Report dated Mar. 27, 2015.
European Office Action mailed Feb. 23, 2016.

*Primary Examiner* — Fred Tzeng
(74) *Attorney, Agent, or Firm* — Harness, Dickey and Pierce, P.L.C.

(57) ABSTRACT

A coordinate detection system detects coordinates of a position to which an electronic pen points on a surface of a display. The coordinate detection system includes a plurality of detecting elements configured to detect light emitted from each of light emission points of the electronic pen, and a coordinate detection unit configured to detect the coordinates of the position to which the electronic pen points based on a distance relationship between first images of the light emission points in an image formed by the light detected by each of the plurality of detecting elements and second images of the light emission points formed by reflection of the first images on the surface of the display.

13 Claims, 12 Drawing Sheets

(56) References Cited

U.S. PATENT DOCUMENTS

| | | | | |
|---|---|---|---|---|
| 5,440,114 | A * | 8/1995 | Barbier | G06F 3/0386 |
| | | | | 250/203.2 |
| 6,429,856 | B1 | 8/2002 | Omura et al. | |
| 8,711,092 | B2 * | 4/2014 | Soh | G06F 3/03542 |
| | | | | 345/157 |
| 9,146,625 | B2 * | 9/2015 | Myung | G06F 3/0354 |
| 2008/0018599 | A1 * | 1/2008 | Chang | G06F 3/0304 |
| | | | | 345/158 |
| 2008/0198581 | A1 * | 8/2008 | Lee | B43K 7/00 |
| | | | | 362/118 |
| 2011/0167628 | A1 | 7/2011 | Goertz et al. | |
| 2011/0316813 | A1 * | 12/2011 | Gu | G06F 3/0428 |
| | | | | 345/175 |
| 2012/0249490 | A1 * | 10/2012 | Lee | G06F 3/03542 |
| | | | | 345/179 |
| 2012/0268429 | A1 * | 10/2012 | Lee | G06F 3/03542 |
| | | | | 345/179 |
| 2012/0299878 | A1 * | 11/2012 | Takeda | G06F 3/0317 |
| | | | | 345/175 |
| 2013/0027357 | A1 * | 1/2013 | Liu | G06F 3/0416 |
| | | | | 345/175 |
| 2013/0057517 | A1 * | 3/2013 | Kao | G06F 3/0416 |
| | | | | 345/175 |
| 2014/0085242 | A1 * | 3/2014 | Sawada | G06F 3/042 |
| | | | | 345/173 |
| 2015/0070328 | A1 * | 3/2015 | Yamaguchi | G06F 3/0321 |
| | | | | 345/175 |

* cited by examiner

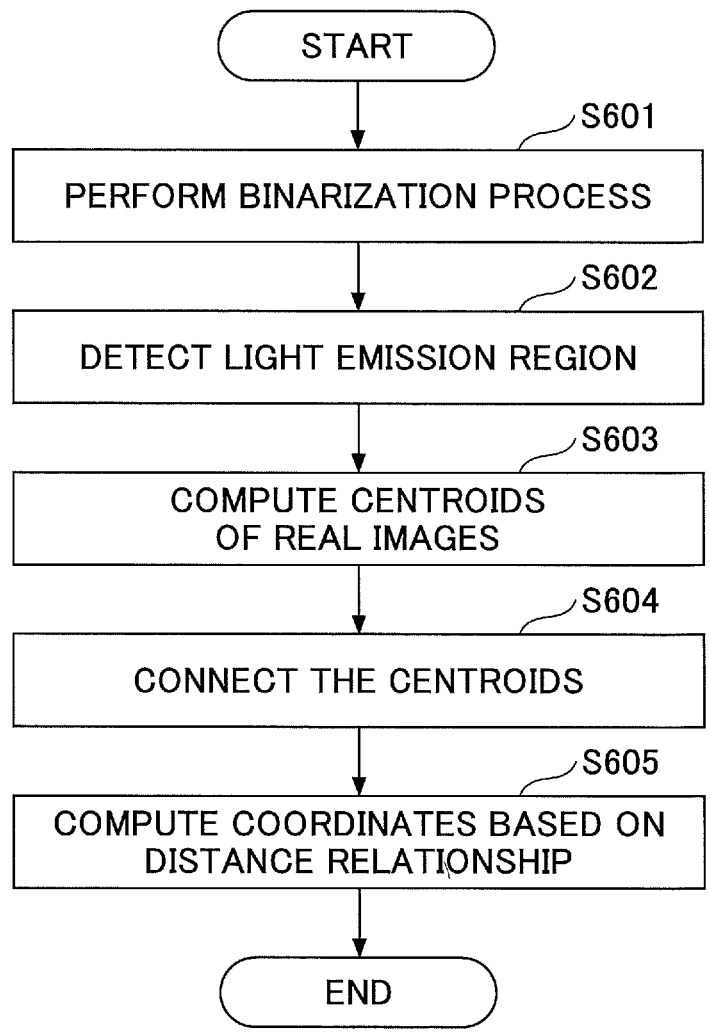

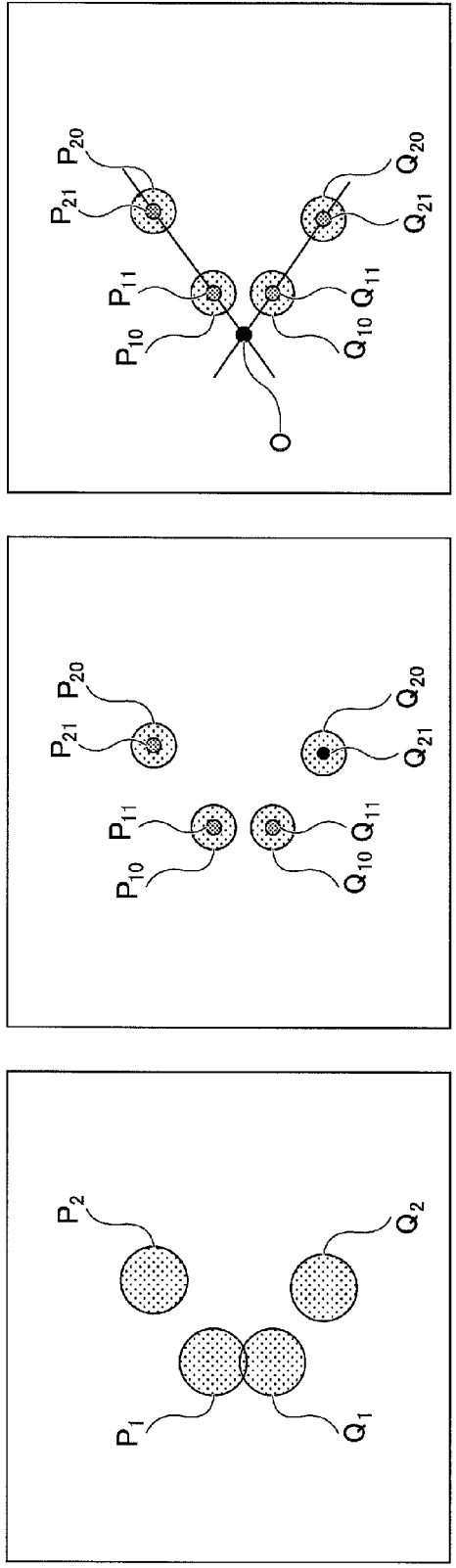

COORDINATE DETECTION SYSTEM, INFORMATION PROCESSING APPARATUS, AND RECORDING MEDIUM

BACKGROUND OF THE INVENTION

1. Field of the Invention

The present invention relates to a coordinate detection system, an information processing apparatus, and a recording medium.

2. Description of the Related Art

A system in which an optical information input device is disposed on a board surface of an electronic whiteboard device and handwritten information depicted on the board surface by a user is input in real time to a computer such as a personal computer via the optical information input device is known.

For example, Japanese Laid-Open Patent Publication No. 2004-038528 discloses an optical coordinate detection device including a large-sized coordinate detection plane (display). This coordinate detection device is equipped with a position indicator (a pen-shaped instrument) having light emission points. In this position indicator (electronic pen), two light emission points are provided on a grip part of the position indicator, and a position of the tip of the position indicator is computed based on positions of the light emission points detected by optical sensors.

However, in the above-described coordinate detection device, the impact of mirror-reflection characteristics of a board surface of the display on the computation results is not taken into consideration. In a case where the image quality deteriorates (e.g., when two images of the light emission points overlap each other), the computation of the position of the tip of the position indicator is prone to having a significant error. Hence, the above-described coordinate detection device has a problem that the detection of coordinates of the tip of the position indicator in such a case may be inaccurate.

SUMMARY OF THE INVENTION

In one aspect, the present invention provides a coordinate detection system which is capable of detecting coordinates of an electronic pen with sufficient accuracy.

In an embodiment which solves or reduces one or more of the above-described problems, the present invention provides a coordinate detection system which detects coordinates of a position to which an electronic pen points on a surface of a display, the coordinate detection system including: a plurality of detecting elements configured to detect light emitted from each of light emission points of the electronic pen; and a coordinate detection unit configured to detect the coordinates of the position to which the electronic pen points based on a distance relationship between first images of the light emission points in an image formed by the light detected by each of the plurality of detecting elements and second images of the light emission points formed by reflection of the first images on the surface of the display.

Other objects, features and advantages of the present invention will become more apparent from the following detailed description when read in conjunction with the accompanying drawings.

BRIEF DESCRIPTION OF THE DRAWINGS

FIG. 6 is a flowchart for explaining a procedure of detecting coordinates to which the electronic pen points using only real images of light emission points according to a comparative example.

FIGS. 11A, 11B and 11C are diagrams showing examples of real and virtual images acquired by the detecting elements in the procedure of the flowchart of FIG. 9.

DETAILED DESCRIPTION OF THE PREFERRED EMBODIMENTS

Some embodiments of the present invention are now described by way of example only and with reference to the accompanying drawings. The same reference number represents the same element or the same type of element on all the drawings.

Figure 1:
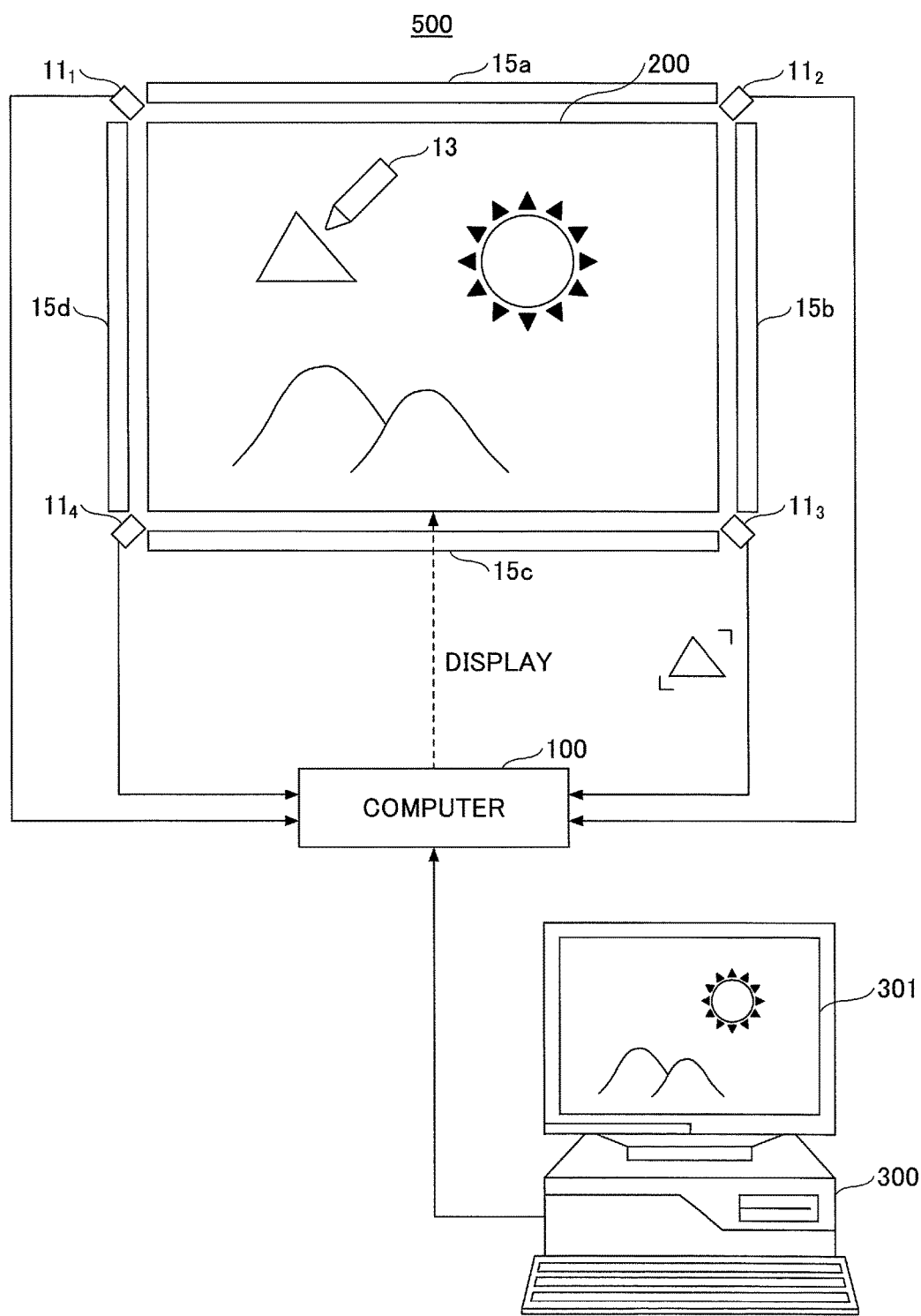
FIG. 1 is a diagram showing a system configuration of a coordinate detection system according to an embodiment of the invention.

FIG. 1 shows a system configuration of a coordinate detection system 500 according to an embodiment of the present invention. As shown in FIG. 1, the coordinate detection system 500 includes a display device 200, four detecting elements $11_1$-$11_4$, four peripheral light emitting portions 15a-15d, a computer 100, a PC (personal computer) 300, and a display device 301. The PC 300 and the display device 301 are optional elements of the coordinate detection system 500. In the following, when indicating one or more arbitrary ones of the detecting elements $11_1$-$11_4$ collectively, the detecting elements will be called the detecting elements 11. When indicating one or more arbitrary ones of the peripheral light emitting portions 15a-15d collectively, the peripheral light emitting portions will be called the peripheral light emitting portions 15. In a case in which one electronic pen 13 is provided on a board surface of the display device 200 to perform pointing operation, it is adequate for the coordinate detection system 500 to include at least two detecting elements 11 (e.g., the detecting elements $11_1$ and $11_2$). Moreover, the peripheral light emitting portions 15 may be provided on an as needed basis.

The detecting element 11 is an imaging portion which creates an image from light emitted by the electronic pen 13 or the peripheral light emitting portion 15. For example, the detecting element 11 includes an imaging forming lens (not shown) which focuses incidence light, and a solid state image sensor (not shown) which is a light receiving unit to receive the incidence light via the imaging forming lens and create an image from the incidence light. Based on the quantity of the incident light to the solid state image sensor (not shown), the coordinate information of a position to which the electronic pen 13 points may be acquired.

Examples of the solid state image sensor include a CCD, a CMOS, etc. in which a plurality of light receiving elements is arranged in a line. Alternatively, a solid state image sensor in which a plurality of light receiving elements is arranged in a two dimensional formation may be used instead. Moreover, a filter which penetrates only a predetermined range of wavelengths of the incidence light may be provided at a portion preceding the solid state image sensor. A light receiving surface of the solid state image sensor may be arranged to be perpendicular to the board surface of the display device 200.

The four peripheral light emitting portions 15a-15d are arranged on or detachably attached to outer peripheral parts of the display device 200, respectively. For example, when a range of detection of the coordinate detection system 500 is consistent with a displaying region of the display device 200 in which an image output from the computer 100 is displayed, the peripheral light emitting portions 15 whose lengths vary depending on the size of the display device 200 are arranged. The PC 300 is connected to the computer 100 and the computer 100 is capable of displaying an image output from the PC 300 on the display device 200.

An application for implementing the coordinate detection system 500 is installed in the computer 100. The application detects positions on the board surface of the display device 200 operated by a user, based on signals output from the detecting elements 11. The application analyzes a gesture based on the detected positions and controls the computer 100. The application is configured to display menus for user's operations on the display device 200.

For example, when the user touches a menu to draw a line and then depicts a figure on the board surface of the display device 200 using the electronic pen 13, the computer 100 analyzes positions touched by the electronic pen 13 in real time and generates time-series coordinates of the positions. The computer 100 connects the time-series coordinates to draw a line and displays the line on the display device 200. In an example of FIG. 1, the user moves the electronic pen 13 in accordance with a triangular shape, and the computer 100 stores a series of coordinates as a single stroke (a triangle). The computer 100 superimposes the triangular image on the image output from the PC 300 and displays the resulting image on the display device 200.

In this manner, even if the display device 200 does not have a touch-panel function, the application of the coordinate detection system 500 enables the user to perform various operations by touching the display device 200 with the electronic pen 13.

Figure 2:
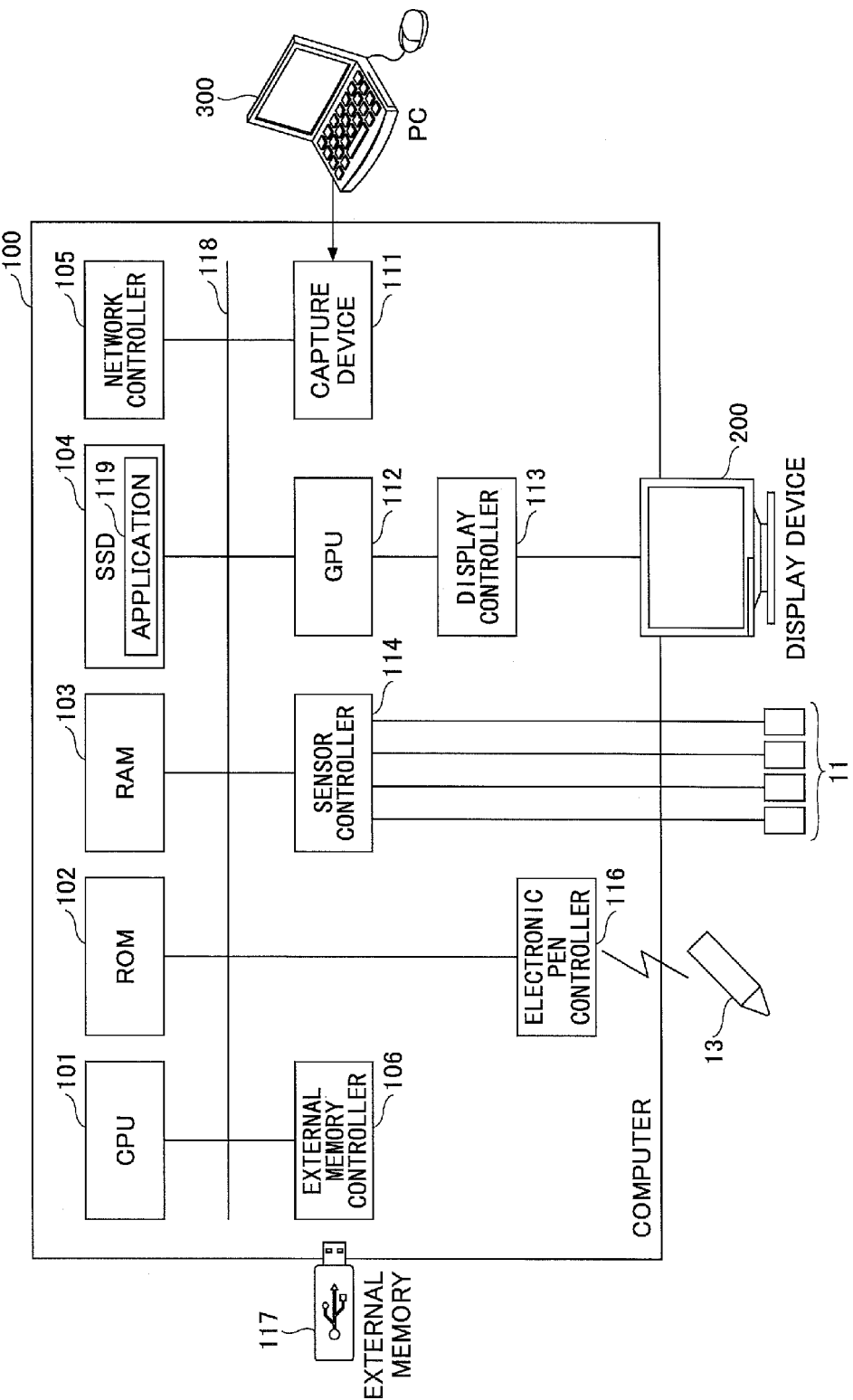
FIG. 2 is a diagram showing a hardware configuration of a computer in the coordinate detection system.

FIG. 2 shows a hardware configuration of the computer 100 in the coordinate detection system 500. The computer 100 is a commercially available information processing apparatus or an information processing apparatus developed for a coordinate detection system. As shown in FIG. 2, the computer 100 includes a CPU (central processing unit) 101, a ROM (read-only memory) 102, a RAM (random access memory) 103, an SSD (solid state drive) 104, a network controller 105, an external memory controller 106, a sensor controller 114, a GPU (graphics processing unit) 112, and a capture device 111, which are electrically connected through a bus line 118, such as an address bus and a data bus.

The CPU 101 executes the applications and controls the operation of the overall coordinate detection system 500. The ROM 102 stores an IPL (initial program loader) and programs which are executed by the CPU 101 mainly at the time of starting. The RAM 103 provides a work area for the CPU 101 when executing the application. The SSD 104 is a non-volatile memory which stores an application 119 for implementing the coordinate detection system 500, and various data. The network controller 105 performs processing based on the communications protocol when communicating with a server through a network (not shown). The network may be a LAN (local area network) or a WAN (wide area network, e.g., the internet) to which two or more LANs are connected.

The external memory controller 106 performs writing data to or reading data from an external memory 117 which is detachably attached to the external memory controller 106. The external memory 117 is a recording medium, such as a USB (universal serial bus) memory or an SD (secure digital) memory card. The capture device 111 takes in or captures an image which is displayed on the display device 301 by the PC 300. The GPU 112 is a graphics processor which computes pixel values of pixels of an image to be displayed on the display device 200. The controller displays 113 outputs an image generated by the GPU 112 to the display device 200.

The four detecting elements $11_1$-$11_4$ are connected to the sensor controller 114. For example, the sensor controller 114 performs detection of coordinates by a triangulation method utilizing infrared light, which will be described later.

In the present embodiment, it is not necessary that the computer 100 communicates with the electronic pen 13, but the computer 100 may have a communication function. In such a case, the computer 100 includes the electronic pencil controller 116 as shown in FIG. 2, and receives a signal from the electronic pen 13 via the electronic pencil controller 116 when the electronic pen 13 is depressed on the display surface (provided that the electronic pen 13 includes a notification unit). Hence, the computer 100 is capable of detecting whether the tip of the electronic pen 13 is pressed down on the board surface of the display device 200.

The application 119 for implementing the coordinate detection system 500 which is stored in the external memory 117 may be distributed. Alternatively, the application 119 may be downloaded from a non-illustrated server through the network controller 105. The application 119 may be provided in a compressed state or in an executable form.

Figure 3:
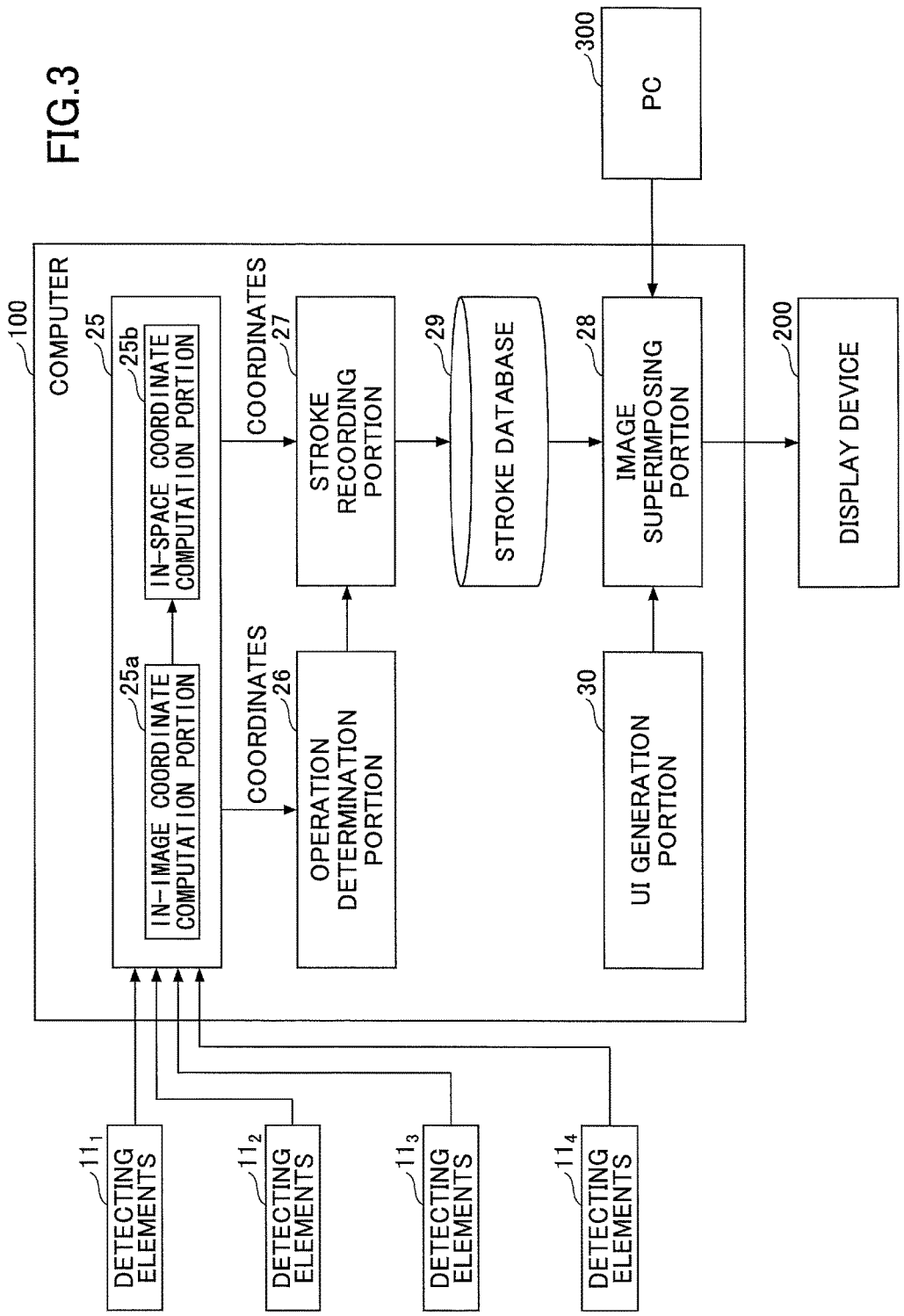
FIG. 3 is a block diagram showing a functional configuration of a computer in the coordinate detection system.

FIG. 3 shows a functional configuration of the computer 100 in the coordinate detection system 500. As shown in FIG. 3, the computer 100 is configured to include a coordinate computation portion 25, an operation determination portion 26, a stroke recording portion 27, an image superimposing portion 28, a storage database 29, and a UI generation portion 30. The functions illustrated are implemented by executing the application 119 by the CPU 101 in cooperation with the hardware, such as the detecting element 11 and the resources of the computer 100.

The signals output from the detecting elements 11 are sent to the coordinate computation portion 25. The coordinate computation portion 25 includes an in-image coordinate detection portion 25a and an in-space coordinate detection portion 25b. The coordinate computation portion 25 functions as a coordinate detection unit configured to compute the coordinates of a position to which the electronic pen 13 points on the board surface of the display device 200 by means of a triangulation method. A detailed method of computation of the coordinates used by each of the in-image coordinate detection portion 25*a* and the in-space coordinate detection portion 25*b* of the computation portion 25 will be described later.

The coordinates computed by the coordinate computation portion 25 are output to each of the operation determination portion 26 and the stroke recording portion 27. The operation determination portion 26 detects physical gestures (a tap, a pinch, a drag, etc.) based on the coordinates and identifies a user's operation. When the coordinates correspond to a position of a menu displayed as a UI (user interface) and a particular gesture is detected based on the coordinates, the operation determination portion 26 receives the menu selected by the coordinates.

When the user's operation is not the menu operation, the stroke recording portion 27 records a set of periodically detected coordinates in the stroke database 29 as a stroke representing a handwritten line. A set of stroke data pieces depicted on each page is stored in the stroke database 29 on a page-by-page basis. One stroke data piece includes a set of coordinates representing a handwritten line. In addition to the coordinates, a color and a line width may be recorded in the stroke database 29.

The UI generation portion 30 is configured to generate a UI image which is provided beforehand in the application. The image superimposing portion 28 superimposes the stroke data corresponding to one page combined with the UI image generated by the UI generation portion 30 over the image output from the PC 300, and displays the resulting image on the display device 200. In this manner, the stroke data superimposed on the output image of the PC 300 may be displayed.

Figure 4:
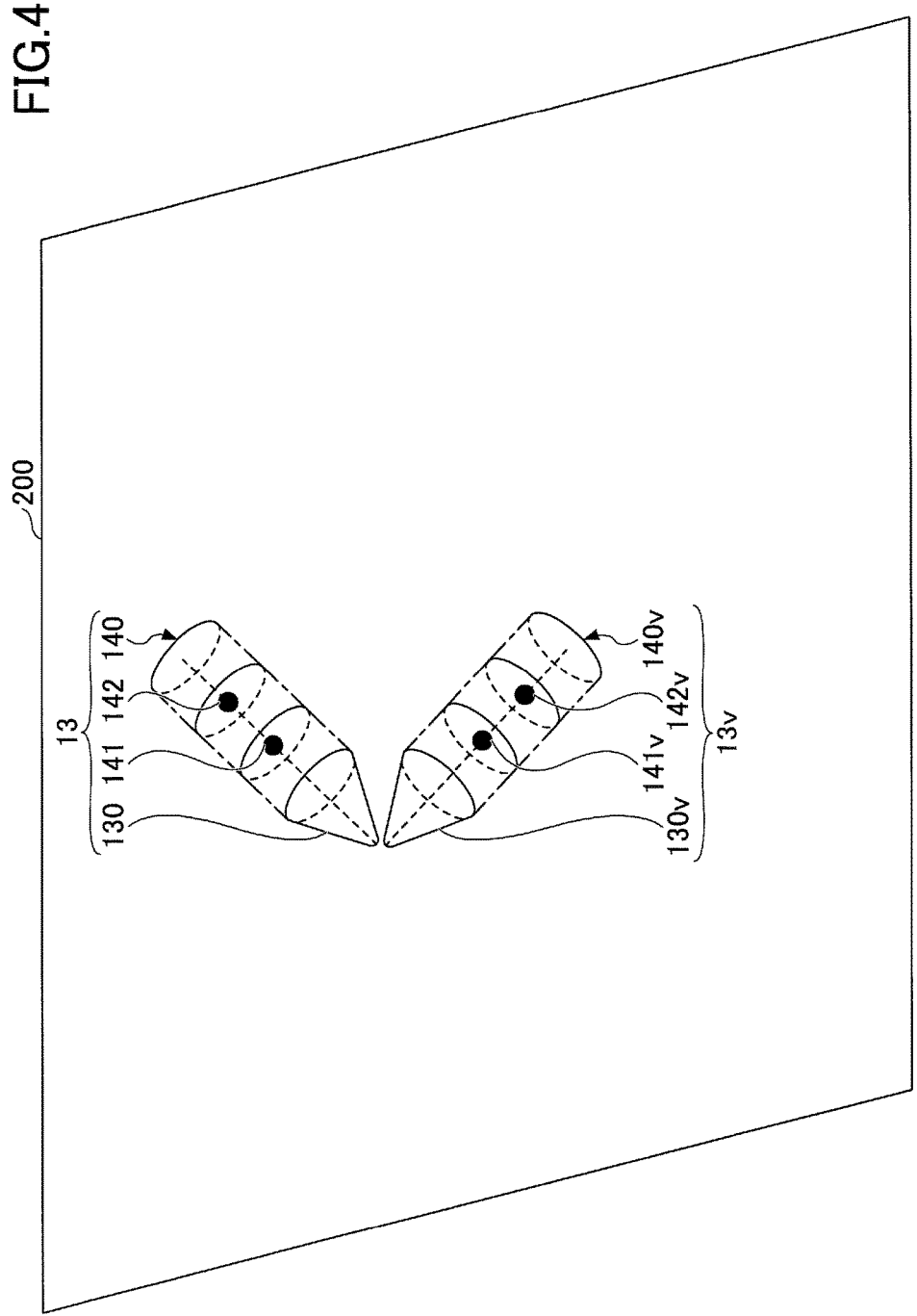
FIG. 4 is a diagram showing a tip of an electronic pen which points to an arbitrary position on a board surface of a display device.

FIG. 4 shows a tip of an electronic pen 13 which points to an arbitrary position on the board surface of the display device 200.

The electronic pen 13 generally includes a moving part 130 and a grip part 140. The moving part 130 is provided in the electronic pen 13 similar to an ink-absorbent felt tip provided in a normal marker pen used for a user handwriting on a white board. A pressure sensor which is not illustrated is disposed between the moving part 130 and the grip part 140.

The moving part 130 is arranged to be movable in a direction parallel to an axial direction of the grip part 140. The moving part 130 may be made of a rigid material such as glass or plastics. Alternatively, the moving part 130 may be formed of an elastic, deformable material such as rubber or elastomer.

Figure 5C:
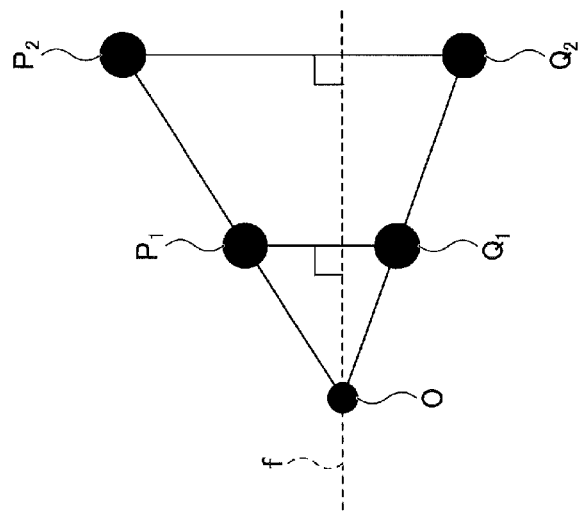
FIGS. 5A, 5B and 5C are diagrams for explaining positions of light emission points and real and virtual images of light emission points acquired by detecting elements.

The grip part 140 is arranged to contain a light source which is not illustrated, an IC (integrated circuit) which controls the pressure sensor, and a battery, which are built in the grip part 140. For example, the light source is a LED (light emitting diode) which emits light of a predetermined wavelength which penetrates the moving part 130. Two light emission points 141 and 142 are arranged at predetermined positions in the axial direction of the grip part 140, and the light from the light source is emitted from the light emission points 141 and 142. As shown in FIG. 5A, the light emission point 141 is allocated at a distance $L_1$ from the position of the moving part 130, and the light emission point 142 is allocated at a distance $L_2$ from the light emission point 141.

The pressure sensor is a sensor configured to detect a pressure of the moving part 130. When the detected pressure is greater than a threshold value, the pressure sensor outputs an ON signal to the IC. When the IC receives the ON signal, the light source is turned ON. When the IC receives no ON signal, the light source is turned OFF. Hence, handwriting pressure is detected with the moving part 130 and turning ON and OFF of the light source (the light emission points 141 and 142) in the grip part 140 may be controlled based on the detected pressure.

In the foregoing embodiment, the electronic pen 13 is configured so that handwriting pressure is detected with the moving part 130 and turning ON and OFF of the light source in the grip part 140 may be controlled based on the detected pressure. Alternatively, the electronic pen 13 may be configured so that a switch for turning ON and OFF of the light source is arranged in the grip part 140 and turning ON and OFF of the light source is controlled by manually turning ON or OFF the switch by the user at the time of handwriting. The switch may be provided in the pressure sensor.

As described above, the light source (the light emission points 141 and 142) in the grip part 140 emits light when the user performs handwriting, and the detecting elements 11 are capable of detecting the coordinates during the user handwriting.

The electronic pen 13 may be configured to include a notification unit which is comprised of any one of a radio wave generation device, an acoustic wave generation device, and a light emitting device for emitting light whose wavelength is different from that of the light source in the grip part 140. In this case, when the IC in the grip part 140 detects an ON signal output from the pressure sensor, the notification unit is controlled to output a notification any one of radio waves, acoustic waves, and light beams. The electronic pencil controller 116 of the computer 100 detects that the user handwriting is in progress by receiving the notification from the notification unit.

In the foregoing embodiment, it is possible to detect that the user handwriting is in progress, by using the notification unit other than the light emitted from the light emission points 141 and 142, and it is possible to acquire the coordinates of the electronic pen 13 from the light emitted from the light emission points 141 and 142 even if the user handwriting is not in progress. Hence, the user may utilize the electronic pen 13 for the purposes other than handwriting. For example, when no pressure is exerted on the tip of the electronic pen 13, the operation determination portion 26 may receive operation for designating a region, and when pressure is exerted on the tip of the electronic pen 13, the stroke recording portion 27 may receive operation for recording a stroke.

The peripheral light emitting portions 15 are implemented by rod-like light emitting units which are arranged so that axial directions of the light emitting units are parallel to the four sides of the display device 200, respectively. For example, each of the light emitting units includes a light source and a multi-layered member made of a prism sheet, a diffusion plate, a lightguide plate and a reflection film. Light emitted by the light source, such as a lamp or a LED, is introduced to the multi-layered member so that the light emitting unit having a bright uniform luminescent surface may be formed. For example, the peripheral light emitting portions 15 are arranged to project over the board surface of the display device 200.

The peripheral light emitting portions 15 are arranged to automatically start emitting light upon power-up of the coordinate detection system 500. Alternatively, the peripheral light emitting portions 15 may be arranged so that a user operates switching ON and OFF of the peripheral light emitting portions 15 independently of the power source of the coordinate detection system 500. A light emission intensity of the peripheral light emitting portions 15 is smaller than a light emission intensity of the light emission points 141 and 142 of the grip part 140.

It is not necessary that a wavelength of light emitted by the peripheral light emitting portions 15 is equal to a wavelength of light emitted by the electronic pen 13. However, the solid state image sensors of the detecting elements 11 are sensitive to a wavelength of light emitted by the peripheral light emitting portions 15. For example, it is preferred that both a wavelength of light of the electronic pen 13 and a wavelength of light of the peripheral light emitting portions 15 belong to the range of infrared light. However, while the wavelengths of light of the electronic pen 13 and the peripheral light emitting portions 15 belong to the range of infrared light, the peak wavelengths thereof may differ. In this case, the light of the electronic pen 13 may be separated from the light of the peripheral light emitting portions 15 based on the difference in the peak wavelength. Moreover, if visible light other than the light of the electronic pen 13 and the light of the peripheral light emitting portions 15 can be prevented from entering the detecting elements 11, one or both of the wavelengths of light of the electronic pen 13 and the peripheral light emitting portions 15 may belong to the range of visible light.

In FIG. 4, the four detecting elements 11 (not shown) may be arranged at four corners (vertices) of the board surface of the display device 200 as an example of the arrangement. However, the number of the detecting elements 11 may vary depending on the number of the electronic pens 13 to be detected in the detection range simultaneously. Based on the principle of triangulation, the coordinates of a position on the board surface of the display device 200 may be detected by two of the detecting elements 11.

When the number of the detecting elements 11 is m (where m is a positive integer), the coordinates of (m−1) positions may be detected simultaneously. In addition, even if the number of the detecting elements 11 is m, the coordinates of m or greater positions may also be detected simultaneously by mathematical processing. Namely, the number of the electronic pens may be greater than one, and if the number of the detecting elements 11 is m, the coordinates of (m−1) or greater positions to which such electronic pens point may be detected simultaneously.

FIG. 4 schematically shows an electronic pen $13v$ which is a virtual image of the electronic pen 13 by mirror reflection of the board surface of the display device 200. Similarly, a moving part $130v$, a grip part $140v$, a light emission point $141v$, and a light emission point $142v$ shown in FIG. 4 are respective virtual images of the moving part 130, the grip part 140, the light emission point 141, and the light emission point 142.

As shown in FIG. 4, the electronic pen 13 as a real image and the electronic pen $13v$ as the virtual image appear on the opposite sides of a line on the board surface of the display device 200. Namely, the electronic pen $13v$ lies in the position by mirror reflection of the electronic pen 13 on the board surface of the display device 200.

Figure 5B:
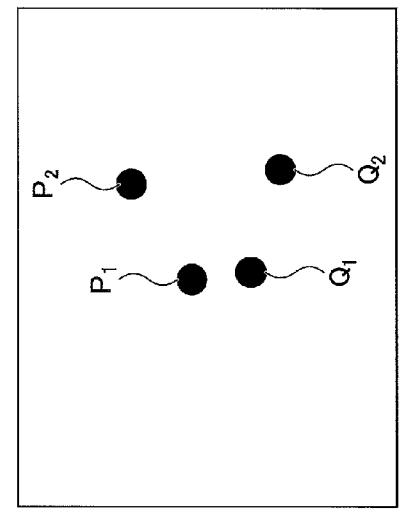
Figure 5A:
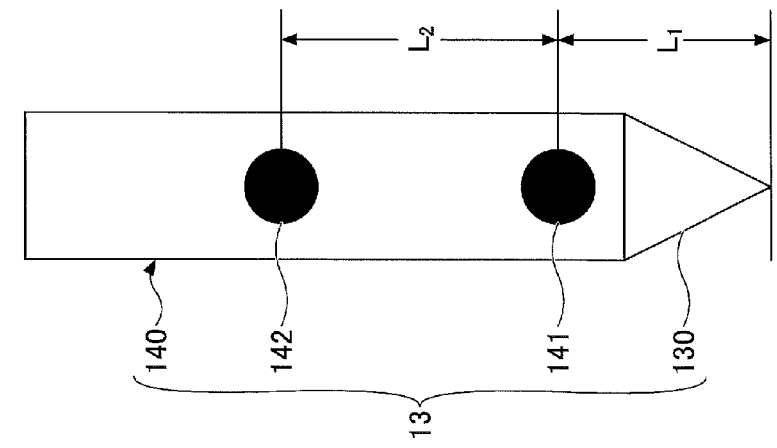

FIG. 5B shows examples of real images $P_1$ and $P_2$ and virtual images $Q_1$ and $Q_2$ which are acquired by the detecting elements 11. As shown in FIG. 5B, the detecting elements 11 detect the real images $P_1$ and $P_2$ of the light emission points 141 and 142 and the virtual images $Q_1$ and $Q_2$ of the light emission points $141v$ and $142v$. Moreover, as shown in FIG. 5C, the real images $P_1$ and $P_2$ and the virtual images $Q_1$ and $Q_2$ have a fixed distance relationship.

Specifically, as shown in FIG. 5C, a line segment which connects the real image $P_1$ and the virtual image $Q_1$ is perpendicular to a board surface f of the display device 200. Similarly, a line segment which connects the real image $P_2$ and the virtual image $Q_2$ is perpendicular to the board surface f of the display device 200. Hence, the line segment which connects the real image $P_1$ and the virtual image $Q_1$, and the line segment which connects the real image $P_2$ and the virtual image $Q_2$ are parallel to each other.

Moreover, an extension line of a line segment which connects the real image $P_1$ and the real image $P_2$ and an extension line of a line segment which connects the virtual image $Q_1$ and the virtual image $Q_2$ cross each other at a point O on the board surface f of the display device 200, and the following distance relationship is formed $$L_1:L_2=|OP_1|:|P_1P_2|=|OQ_1|:|Q_1Q_2|$$

where $|ab|$ denotes a length of a line segment which connects a point "a" and a point "b" ("a" and "b" are arbitrary points). FIG. 5C schematically shows examples of the real images and the virtual images when viewed from a direction parallel to the board surface f of the display device 200 (or a side direction of the display device 200).

To detect the coordinates of a position to which the tip of the electronic pen 13 shown in FIG. 4 points on the display surface, the real and virtual images of the light emission points 141 and 142 are used in the present embodiment. Before explaining the method of detecting the coordinates according to the present embodiment, a problem which arises in a case of detecting the coordinates of a position to which the electronic pen 13 points using only the real images of the light emission points 141 and 142 according to a comparative example is explained with reference to FIGS. 6 to 8B.

FIG. 6 is a flowchart for explaining a procedure of detecting the coordinates of a position to which the electronic pen points using only the real images of the light emission points according to the comparative example.

As shown in FIG. 6, at step S601, a binarization process is performed on the signals output from the detecting elements 11. At step S602, a light emission region of each of the real images of the two light emission points is detected. At step S603, a centroid of each of the real images of the two light emission points is computed. At step S604, the centroids of the real images of the two light emission points are connected. At step S605, the coordinates of the position to which the tip of the electronic pen 13 points are computed based on the distance relationship described above with reference to FIG. 5C.

Figure 7B:
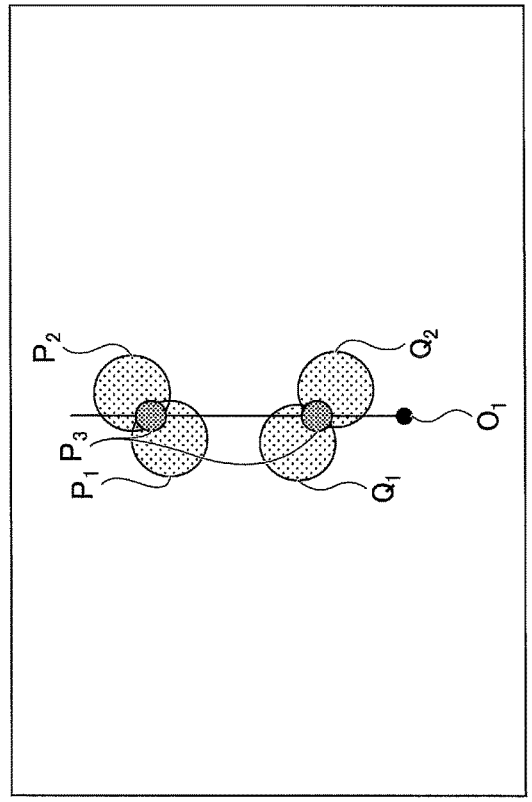
FIGS. 7A and 7B are diagrams showing examples of real and virtual images acquired by the detecting elements in the procedure of the flowchart of FIG. 6.
Figure 7A:
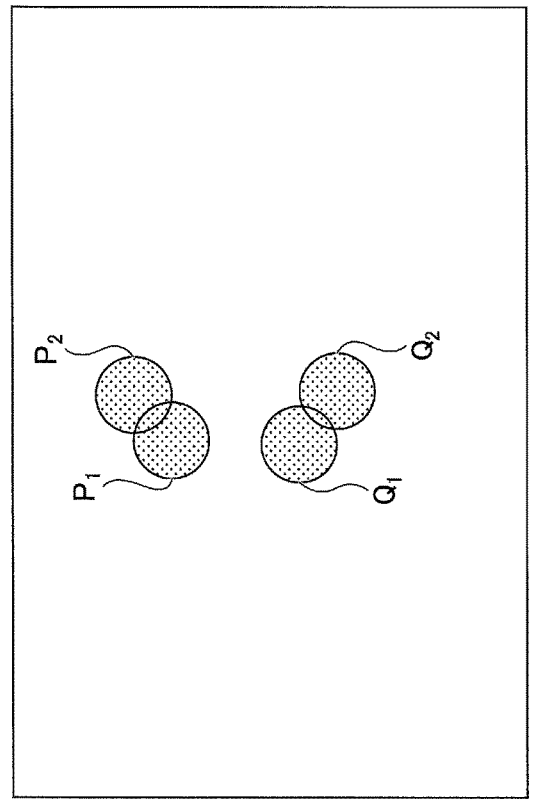

FIGS. 7A through 8B are diagrams showing examples of the real and virtual images acquired by the detecting elements 11 in the procedure of the flowchart of FIG. 6. For example, as shown in FIG. 7A, there is a case in which real images $P_1$ and $P_2$ which spread to a certain extent due to outline blurring overlap each other, and virtual images $Q_1$ and $Q_2$ which spread to a certain extent due to outline blurring overlap each other.

In this case, at step S602, a region in which the real images $P_1$ and $P_2$ overlap is detected as a first light emission region of the real images (improper detection), and a region in which the virtual images $Q_1$ and $Q_2$ overlap is detected as a second light emission region of the real images (improper detection). Namely, improper detection of the virtual images $Q_1$ and $Q_2$ which are originally not to be detected is performed.

As a result, at step S603, two points $P_3$ shown in FIG. 7B are computed as the centroids of the real images of the two light emission points. Subsequently, at steps S604 and S605, a point $O_1$ on an extension line of a line segment which connects the two points $P_3$ shown in FIG. 7B (or on a line segment which connects the two centroids) is recognized as being a position to which the tip of the electronic pen 13 points, and the coordinates of this position are computed. Clearly, the point $O_1$ shown in FIG. 7B considerably diverges from the position to which the tip of the electronic pen 13 points.

Figure 8B:
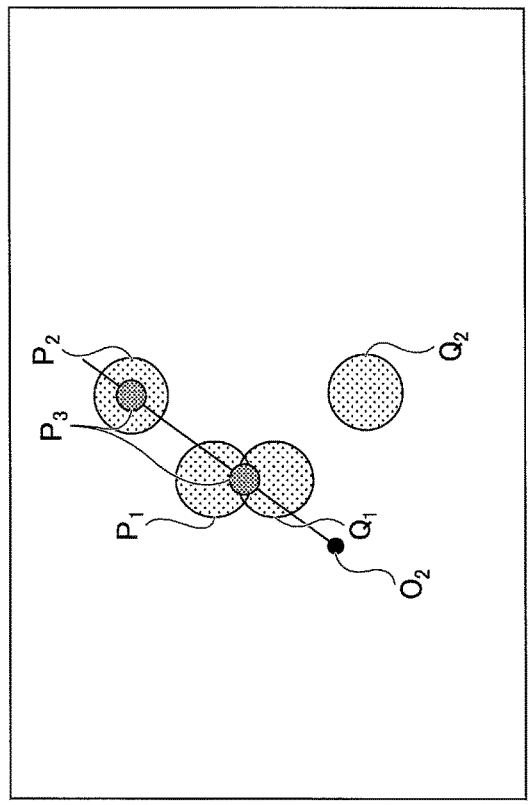
FIGS. 8A and 8B are diagrams showing example of real and virtual images acquired by the detecting elements in the procedure of the flowchart of FIG. 6.
Figure 8A:
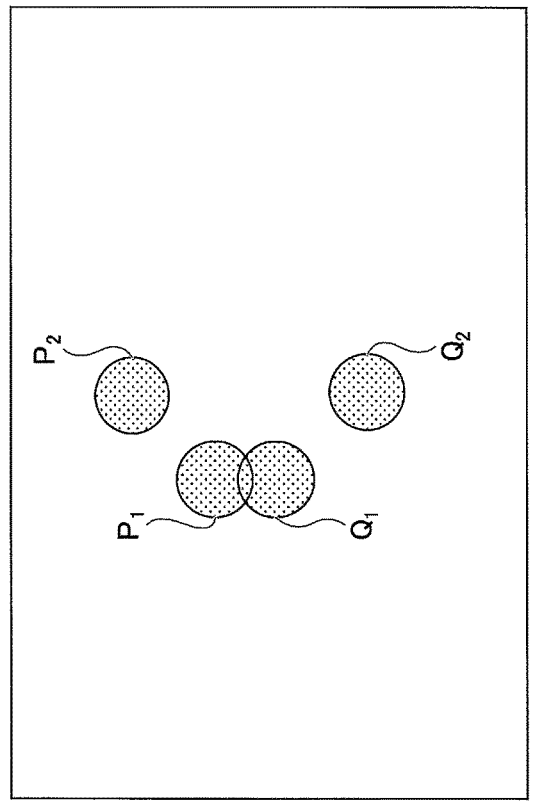

Moreover, as shown in FIG. 8A, there is a case in which a real image $P_1$ which spreads to a certain extent due to outline blurring overlaps with a virtual image $Q_1$ which spreads to a certain extent due to outline blurring.

In this case, at step S602, a region in which the real image $P_1$ and the virtual image $Q_1$ overlap is detected as a first light emission region of the real images (improper detection), and a real image $P_2$ which spreads to a certain extent due to outline blurring is detected as a second light emission region of the real images. Namely, improper detection of the virtual image $Q_2$ which is originally not to be detected is performed.

As a result, at step S603, two points $P_3$ shown in FIG. 8B are computed as the centroids of the real images of the two light emission points. Subsequently, at steps S604 and S605, a point $O_2$ on an extension line of a line segment which connects the two points P3 shown in FIG. 8B (or on a line segment which connects the two centroids) is recognized as being a position to which the tip of the electronic pen 13 points, and the coordinates of this position are computed. Clearly, the point $O_2$ shown in FIG. 8B considerably diverges from the position to which the tip of the electronic pen 13 points.

Thus, in the method of detecting the coordinates of a position to which the electronic pen points using only the real images of the light emission points, the region in which the two images overlap is computed as being one light emission point, and a point on an extension line of a line segment connecting the computed centroids is computed as the coordinates of the position to which the electronic pen points. As a result, as shown in FIG. 7B and FIG. 8B, the computed coordinates diverge from the right coordinates of the position to which the electronic pen points, and such improper detection may cause stroke deviation to arise in subsequent operations.

In order to eliminate the above problem, the method of detecting the coordinates according to the present embodiment determines a position of the electronic pen 13 in each of the images derived from the information output from the detecting elements 11 based on the relative distance relationship between the real images of the light emission points 141 and 142 and the virtual images of the light emission points 141 and 142. Based on the position of the electronic pen 13 determined for each of the images derived, the coordinates of the position to which the electronic pen 13 points are detected by the principle of triangulation. The method of detecting the coordinates according to the present embodiment is explained with reference to FIGS. 9 through 11C.

Figure 9:
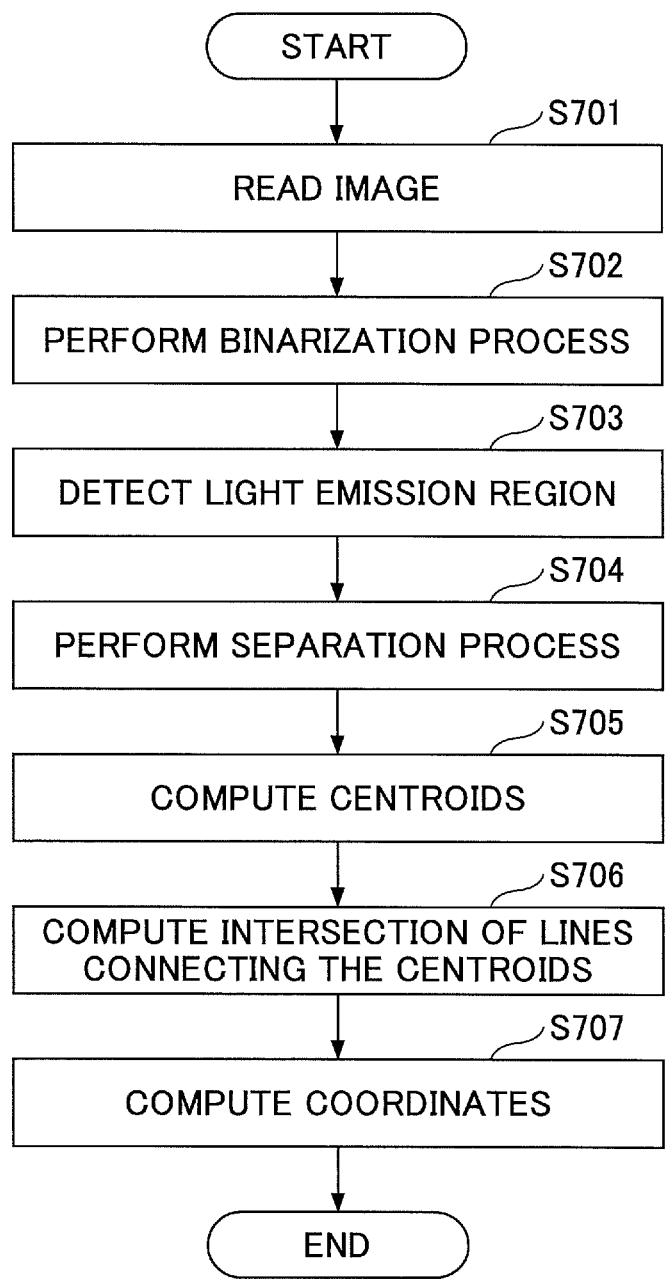
FIG. 9 is a flowchart for explaining a method of detecting the coordinates to which the electronic pen points using real and virtual images of light emission points according to an embodiment of the invention.

FIG. 9 is a flowchart for explaining a procedure of detecting the coordinates to which the electronic pen points using the real and virtual images of the light emission points according to the present embodiment. FIGS. 10A to 12 are diagrams showing examples of the real and virtual images acquired by the detecting elements 11 in the procedure of the flowchart of FIG. 9.

As shown in FIG. 9, at step S701, the in-image coordinate computation portion 25a reads the image output by each of the detecting elements 11. At step S702, the in-image coordinate computation portion 25a performs a binarization process on the read image. For example, in this binarization process, each pixel in the read image is converted into one bit and the value as "1" or "0" (black pixel or white pixel) is assigned depending on whether a brightness value of the pixel is greater than a predetermined threshold value. By the binarization process, each pixel in the read image is converted into a white pixel or a black pixel even if a gray pixel is included in the image. Hence, the boundary of the image is clarified and execution of subsequent processing is facilitated.

Figure 10C:
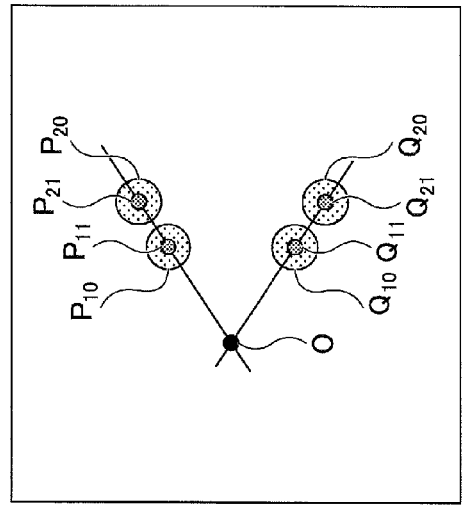
FIGS. 10A, 10B and 10C are diagrams showing examples of real and virtual images acquired by the detecting elements in the procedure of the flowchart of FIG. 9.
Figure 10B:
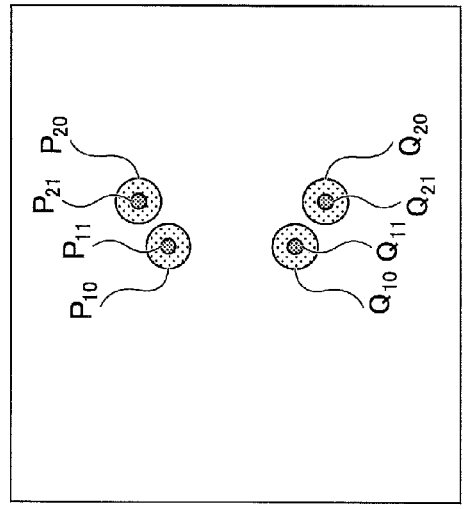
Figure 10A:
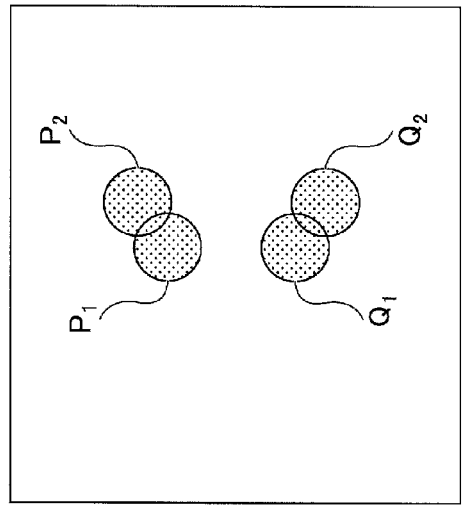

Next, at step S703, the in-image coordinate computation portion 25a detects a light emission region of each of the real images of the two light emission points and a light emission region of each of the virtual images of the two light emission points. For example, real images $P_1$ and $P_2$ which spread to a certain extent and virtual images $Q_1$ and $Q_2$ which spread to a certain extent, as shown in FIG. 10A, are detected as the light emission regions.

Next, at step S704, the in-image coordinate computation portion 25a performs a separation process on a portion of the image in which the light emission regions overlap. For example, in this separation process, spreading of the light emission regions is eliminated (the light emission regions are gradually reduced) by using erosion processing which is one of the two basic morphological operations. Specifically, the portion in which the light emission regions overlap is separated by the separation process. As a result, the two separated real images $P_{10}$ and $P_{20}$ and the two separated virtual images $Q_{10}$ and $Q_{20}$ are acquired as shown in FIG. 10B.

It should be noted that the in-image coordinate computation portion 25a recognizes in advance that four light emission regions (two real images and two virtual images) are detected by the detecting elements 11. Hence, when only two light emission regions are detected due to the overlapping as shown in FIG. 10A, performance of the separation process may be repeated until the four light emission regions are detected. In addition, when there is no overlap and four light emission regions are detected initially, the separation process of step S704 may be skipped.

Next, at step S705, the in-image coordinate computation portion 25a computes a centroid of each of the two virtual images $Q_{10}$ and $Q_{20}$ and computes a centroid of each of the two real images $P_{10}$ and $P_{20}$. For example, as shown in FIG. 10B, a centroid $P_{11}$ of the real image $P_{10}$, a centroid $P_{21}$ of the real image $P_{20}$, a centroid $Q_{11}$ of the virtual image $Q_{10}$, and a centroid $Q_{21}$ of the virtual image $Q_{20}$ are acquired.

Next, at step S706, the in-image coordinate computation portion 25a computes an intersection of an extension line of a line segment which connects the centroid $P_{11}$ of the real image $P_{10}$ and the centroid $P_{21}$ of the real image $P_{20}$ and an extension line of a line segment which connects the centroid $Q_{11}$ of the virtual image $Q_{10}$ and the centroid $Q_{21}$ of the virtual image $Q_{20}$. For example, as shown in FIG. 10C, a point O (intersection) where the extension line of the line segment which connects the centroid $P_{11}$ and the centroid $P_{21}$ and the extension line of the line segment which connects the centroid $Q_{11}$ and the centroid $Q_{21}$ crosses each other is acquired. In contrast with the examples of FIGS. 7A to 8B, the point O is consistent with the right position to which the tip of the electronic pen 13 points in the image detected by each of the detecting elements 11.

As shown in FIG. 11A, there is a case in which it is detected at step S703 that the real image $P_1$ and the virtual image $Q_1$ overlap each other. Also in this case, by the procedure of the flowchart shown in FIG. 9, a point O (intersection) where an extension line of a line segment which connects the centroid $P_{11}$ and the centroid $P_{21}$ and an extension line of a line segment which connects the centroid $Q_{11}$ and the centroid $Q_{21}$ cross each other may be acquired as shown in FIG. 11B and FIG. 11C. Similar to the case shown in FIG. 10C, in contrast with the examples of FIGS. 7A to 8B, the point O in this case is consistent with the right position to which the tip of the electronic pen 13 points in the image detected by each of the detecting elements 11.

It should be noted that the above steps S701-S706 are performed in a duplicated manner by using each of the detecting elements 11. For example, when the two detecting elements $11_1$ and $11_2$ are used, at step S706, a point $O_{10}$ (shown in FIG. 12) in a local image detected by the detecting element $11_1$ is acquired, and a point $O_{20}$ (shown in FIG. 12) in a local image detected by the detecting element $11_2$ is acquired. In contrast with the examples of FIGS. 7A to 8B, both the point $O_{10}$ and the point $O_{20}$ are consistent with the right position to which the tip of the electronic pen 13 points in the local image detected by each of the detecting elements 11.

Figure 12:
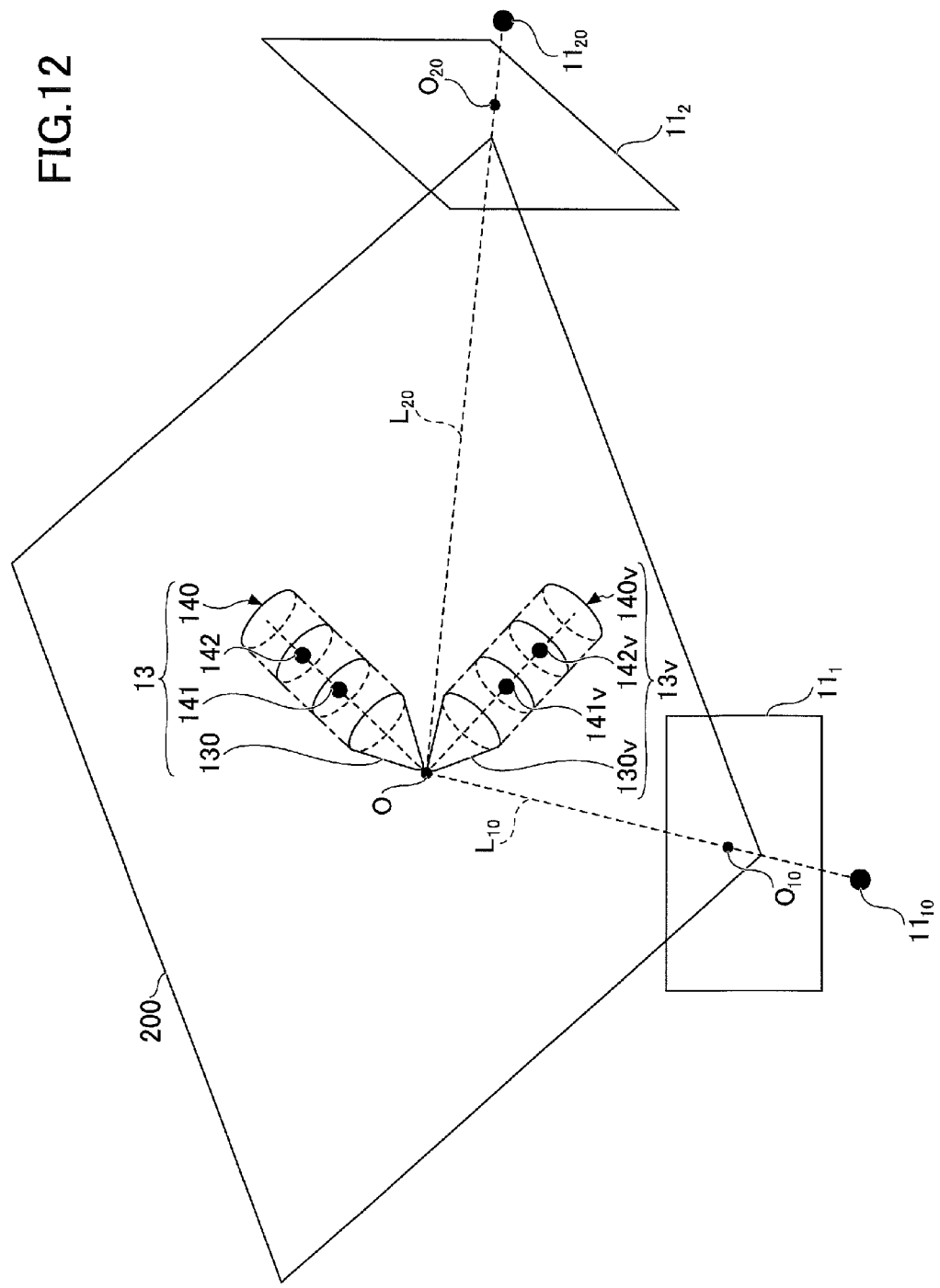
FIG. 12 is a diagram for explaining an example of computation of coordinates by an in-space coordinate computation portion of the computer in the procedure of the flowchart of FIG. 9.

Next, at step S707, the in-space coordinate computation portion 25b computes a position O in a 3D space to which the tip of the electronic pen 13 points, and computes the coordinates $(x_1, y_1)$ of the position O. For example, as shown in FIG. 12, the position O in the 3D space to which the tip of the electronic pen 13 points is computed by an intersection of a line segment $L_{10}$ which passes through the point $O_{10}$ and a center $11_{10}$ of the detecting element $11_1$ and a line segment $L_{20}$ which passes through the point $O_{20}$ and a center $11_{20}$ of the detecting element $11_2$. The computation of the position O may be performed by the principle of triangulation as follows.

It is assumed that $L_{12}$ (not shown) denotes a line segment which connects the center $11_{10}$ of the detecting element $11_1$ and the center $11_{20}$ of the detecting element $11_2$, $\theta_{LA1}$ (not shown) denotes an angle between the line segment $L_{10}$ and the line segment $L_{12}$, and $\theta_{RA1}$ (not shown) denotes an angle between the line segment $L_{20}$ and the line segment $L_{12}$. In this case, the in-space coordinate computation portion 25b is configured to include a table in which the point $O_{10}$ and the angle $\theta_{LA1}$ associated with the point $O_{10}$ are stored, and the point $O_{20}$ and the angle $\theta_{RA1}$ associated with the point $O_{20}$ are stored. The in-space coordinate computation portion 25b is capable of reading the angles $\theta_{LA1}$ and $\theta_{RA1}$ by accessing this table.

Accordingly, the in-space coordinate computation portion 25b computes the coordinates $(x_1, y_1)$ of the position O by the principle of triangulation using the values of the angles $\theta_{LA1}$ and $\theta_{RA1}$, and the known length (which is denoted by w) of the line segment $L_{12}$. Specifically, the coordinates $(x_1, y_1)$ of the position O may be computed in accordance with the following Formulas 1 and 2. The Formulas 1 and 2 are incorporated in the in-space coordinate computation portion 25b as a part of the functions thereof.

$$x_1 = w \cdot \tan\theta_{RA1}/(\tan\theta_{LA1} + \tan\theta_{RA1}) \quad \text{[Formula 1]}$$

$$y_1 = w \cdot \tan\theta_{LA1} \cdot \theta_{RA1}/(\tan\theta_{LA1} + \tan\theta_{RA1}) \quad \text{[Formula 2]}$$

Accordingly, in the coordinate detection method according to the present embodiment, the coordinates $(x_1, y_1)$ of the position O to which the electronic pen 13 points are detected using the real and virtual images of the light emission points 141 and 142, and it is possible to avoid the improper detection as shown in FIGS. 7A to 8B and it is possible to compute the coordinates $(x_1, y_1)$ of the position O with sufficient accuracy.

As described in the foregoing, according to the present invention, it is possible to provide a coordinate detection system which is capable of detecting the coordinates of a position to which the electronic pen points with sufficient accuracy.

The coordinate detection system according to the present invention is not limited to the above-described embodiments, and variations and modifications may be made without departing from the scope of the present invention.

The present application is based upon and claims the benefit of priority of the prior Japanese patent application No. 2013-249002, filed on Dec. 2, 2013, the contents of which are incorporated herein by reference in their entirety.

What is claimed is:

1. A coordinate detection system which detects coordinates of a position to which an electronic pen points on a surface of a display, comprising:
   a plurality of detecting elements each configured to detect emitted light rays emitted from light emission points of the electronic pen, and configured to detect reflected light rays formed by reflection of the emitted light rays on the surface of the display; and
   a coordinate detection unit configured to detect a position to which the electronic pen points based on the emitted light rays and the reflected light rays detected by each of the plurality of detecting elements, and configured to detect the coordinates of the position to which the electronic pen points relative to the surface of the display based on the positions of the electronic pen detected by using the plurality of detecting elements.

2. The coordinate detection system according to claim 1, wherein the coordinate detection unit is configured to compute an in-image position to which the electronic pen points in each of images formed by the light detected by the plurality of detecting elements, and configured to detect the coordinates of the position by a triangulation method based on the in-image positions computed for the images of the plurality of detecting elements.

3. The coordinate detection system according to claim 2, wherein the coordinate detection unit is configured to compute a centroid of a first image of each of the light emission points and a centroid of a second image of each of the light emission points, and configured to compute the in-image position of the electronic pen by an intersection of an extension line of a line segment which connects the centroids of the first images and an extension line of a line segment which connects the centroids of the second images.

4. The coordinate detection system according to claim 3, further comprising first images of the light emission points and second images of the light emission points,
   wherein the coordinate detection unit is configured to perform, prior to the centroid computation, a binarization process on the image output by each of the detecting elements so that each of pixels of the image is converted into a black pixel or a white pixel based on a set threshold value.

5. The coordinate detection system according to claim 4, wherein the coordinate detection unit is configured to detect, after the binarization process and prior to the centroid computation, whether an overlapping portion between the first images of the light emission points and the second images of the light emission points exists, and configured to perform a separation process to separate the overlapping portion when the overlapping portion is detected as existing.

6. The coordinate detection system according to claim 1, further comprising first images of the light emission points and second images of the light emission points, wherein the first images are real images of the light emission points and the second images are virtual images of the light emission points.

7. An information processing apparatus which detects coordinates of a position to which an electronic pen points on a surface of a display, comprising:
a coordinate detection unit configured to detect a position to which the electronic pen points based on emitted light rays and reflected light rays detected by each of a plurality of detecting elements, and configured to detect the coordinates of the position to which the electronic pen points relative to the surface of the display based on the positions of the electronic pen detected by using the plurality of detecting elements.

8. The information processing apparatus according to claim 7, wherein the coordinate detection unit is configured to compute an in-image position to which the electronic pen points in each of images formed by the light detected by the plurality of detecting elements, and configured to detect the coordinates of the position by a triangulation method based on the in-image positions computed for the images of the plurality of detecting elements.

9. The information processing apparatus according to claim 8, wherein the coordinate detection unit is configured to compute a centroid of a first image of each of the light emission points and a centroid of a second image of each of the light emission points, and configured to compute the in-image position of the electronic pen by an intersection of an extension line of a line segment which connects the centroids of the first images and an extension line of a line segment which connects the centroids of the second images.

10. The information processing apparatus according to claim 9, wherein the coordinate detection unit is configured to perform, prior to the centroid computation, a binarization process on the image output by each of the detecting elements so that each of pixels of the image is converted into a black pixel or a white pixel based on a set threshold value.

11. The information processing apparatus according to claim 10, wherein the coordinate detection unit is configured to detect, after the binarization process and prior to the centroid computation, whether an overlapping portion between the first images of the light emission points and the second images of the light emission points exists, and configured to perform a separation process to separate the overlapping portion when the overlapping portion is detected as existing.

12. The information processing apparatus according to claim 7, further comprising first images of the light emission points and second images of the light emission points,
wherein the first images are real images of the light emission points and the second images are virtual images of the light emission points.

13. A non-transitory computer readable recording medium storing computer readable code that, when executed by a processor of an information processing apparatus which detects coordinates of a position to which an electronic pen points on a surface of a display, configures the processor to perform a coordinate detection method comprising:
detecting the coordinates of the position to which the electronic pen points based on emitted light rays and reflected light rays detected by each of a plurality of detecting elements, and configured to detect the coordinates of the position to which the electronic pen points relative to the surface of the display based on the positions of the electronic pen detected by using the plurality of detecting elements.

* * * * *